United States Patent [19]
Orlomoski

[11] 3,850,215
[45] Nov. 26, 1974

[54] SELF-LOCKING FASTENERS
[75] Inventor: Roger W. Orlomoski, North Brookfield, Mass.
[73] Assignee: Litton Industrial Products, Inc., Holden, Mass.
[22] Filed: Aug. 28, 1972
[21] Appl. No.: 284,006

Related U.S. Application Data
[63] Continuation-in-part of Ser. No. 200,933, Nov. 22, 1971.

[52] U.S. Cl.................... 151/22, 10/10 R, 72/88
[51] Int. Cl............................................ F16b 39/30
[58] Field of Search ...... 151/22, 14; 10/10 R, 86 A; 72/88; 85/46

[56] References Cited
UNITED STATES PATENTS

| | | | |
|---|---|---|---|
| 793,824 | 7/1905 | Culliney | 151/22 |
| 2,177,005 | 10/1939 | Purtell | 151/22 |
| 2,301,181 | 11/1942 | Ilsemann | 151/22 |
| 3,124,188 | 3/1964 | Muenchinger | 151/22 |
| 3,517,717 | 6/1970 | Orlomoski | 151/22 |

FOREIGN PATENTS OR APPLICATIONS
288,778 8/1961 Japan

Primary Examiner—Ramon S. Britts
Attorney, Agent, or Firm—Alan C. Rose

[57] ABSTRACT

This invention relates to self-locking fasteners and thread rolling dies for making such fasteners. The self-locking result is achieved by a massive rib which may be continuous or discontinuous in the flank or flanks of one or more turns of the threads over a selective length of the screw or internal thread. The rib is relatively massive and has an open spiral groove between it and the crest of the remainder of the thread to provide compression and resilient bending of the rib. Further, the outermost face of the rib is provided with a bearing surface which is generally parallel to the mating threads, so that with standard threads it is disposed at approximately sixty degrees relative to the axis of the fastener, to preclude scoring of the mating thread despite variations in fit. The screw threads and ribs thereon may be made by the use of flat or circular thread rolling dies in which certain "threads" or ridges in at least one of the dies, have been formed over a suitable length in a corresponding manner. Long die life is achieved with the open groove between the rib and the crest of the remaining thread, because the die edge which forms the groove can have a greater included angle and thus have greater strength.

17 Claims, 20 Drawing Figures

Fig_1
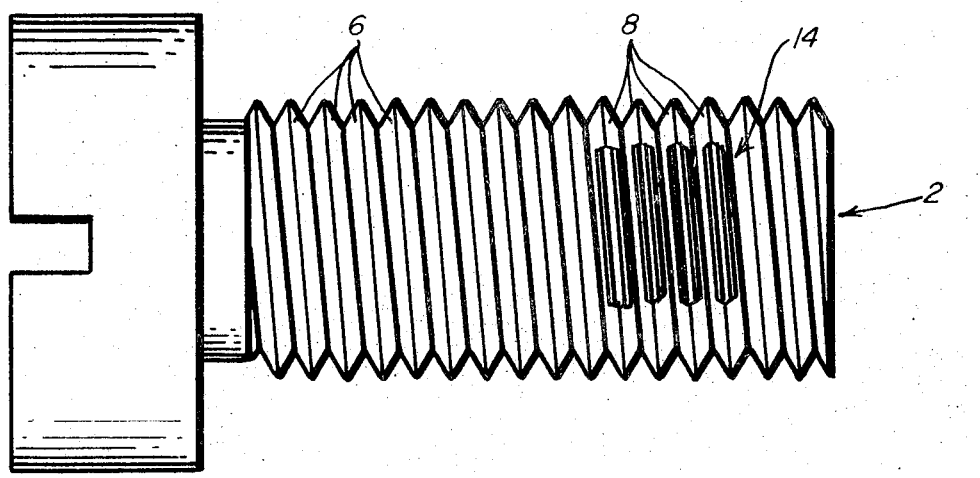
Fig_2
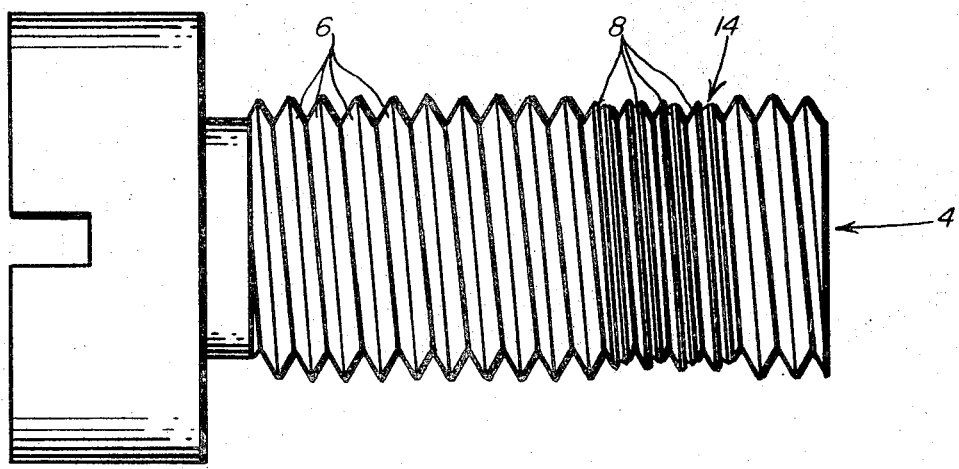

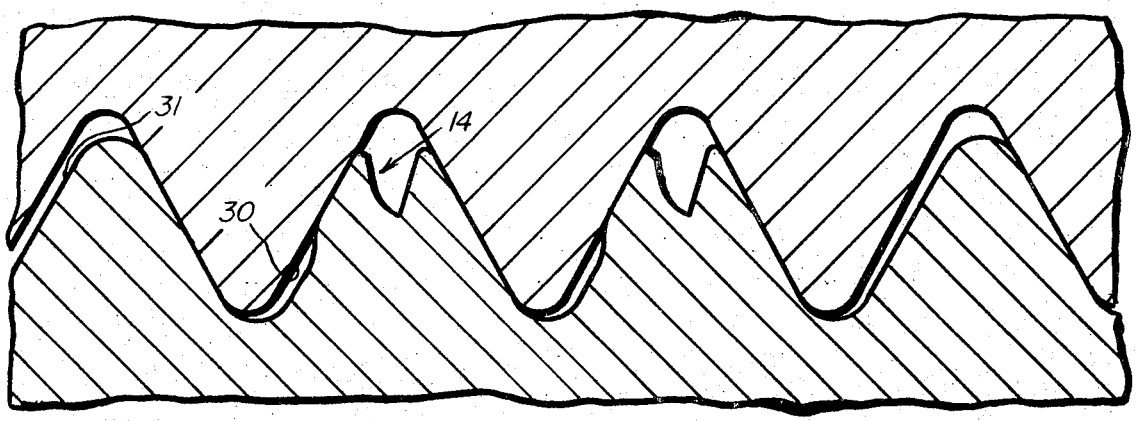
Fig_4
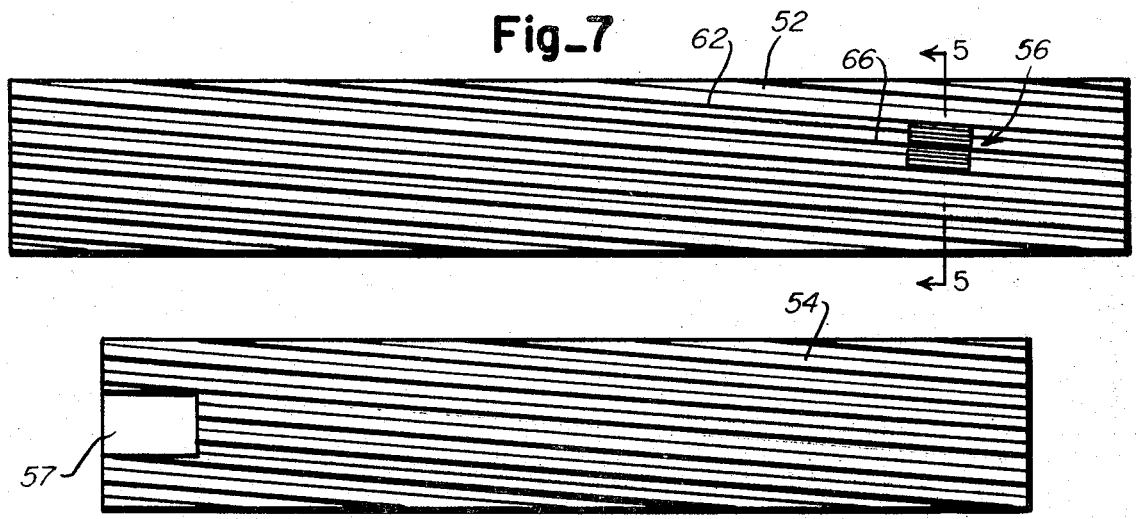
Fig_7
Fig_8
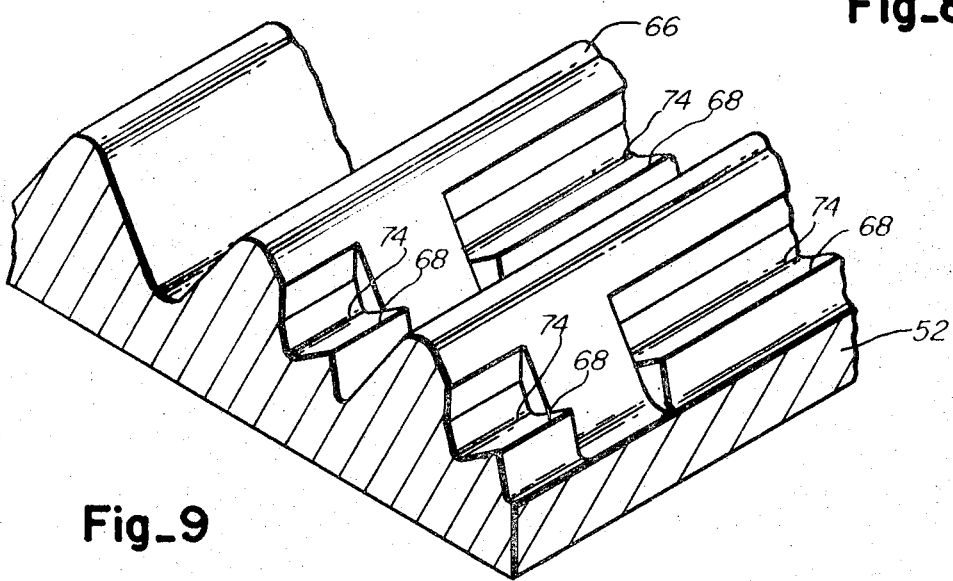
Fig_9

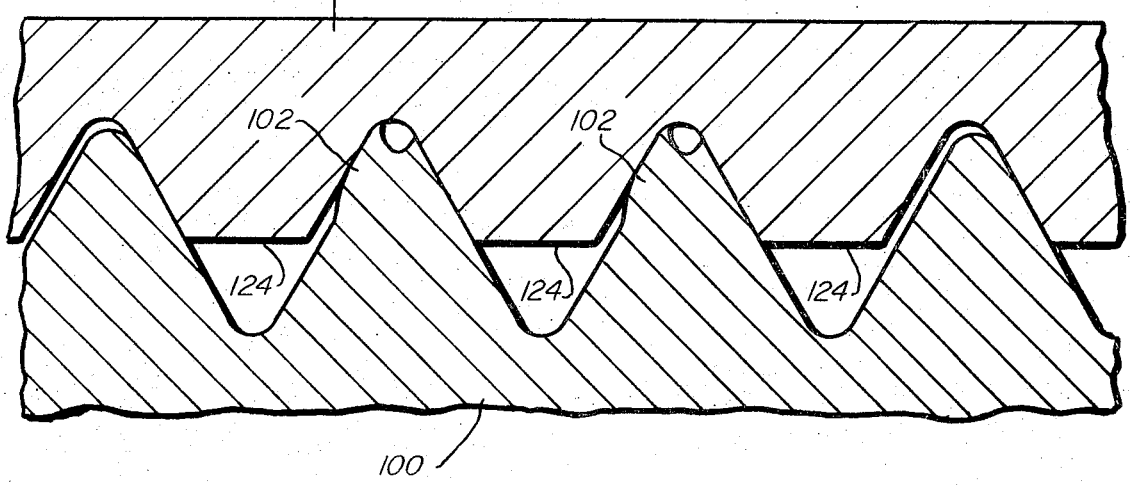
Fig_15
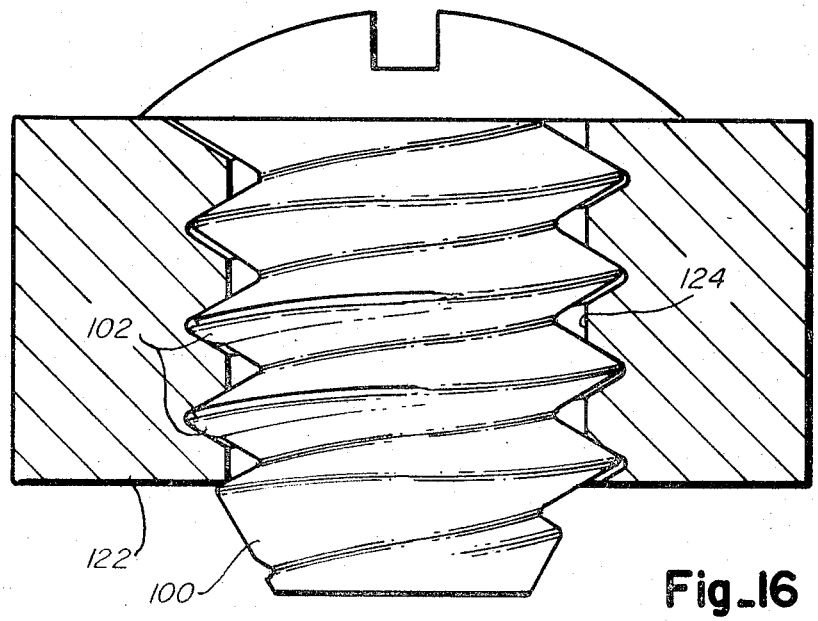
Fig_16

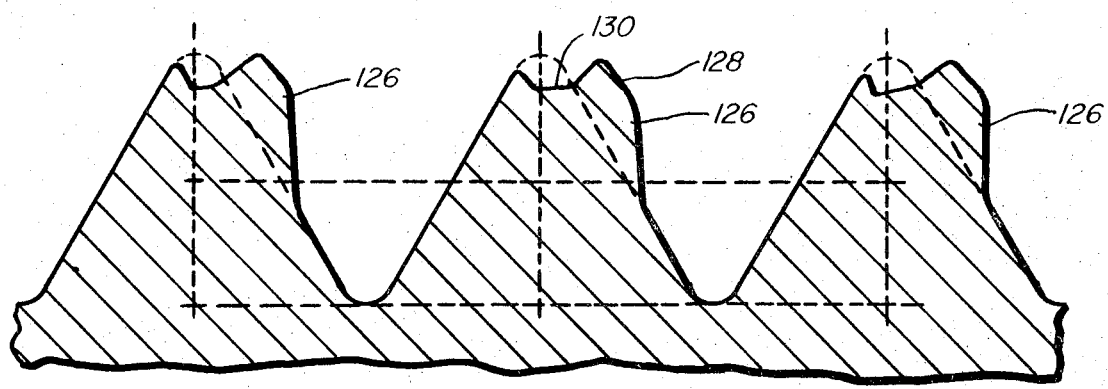
Fig_17
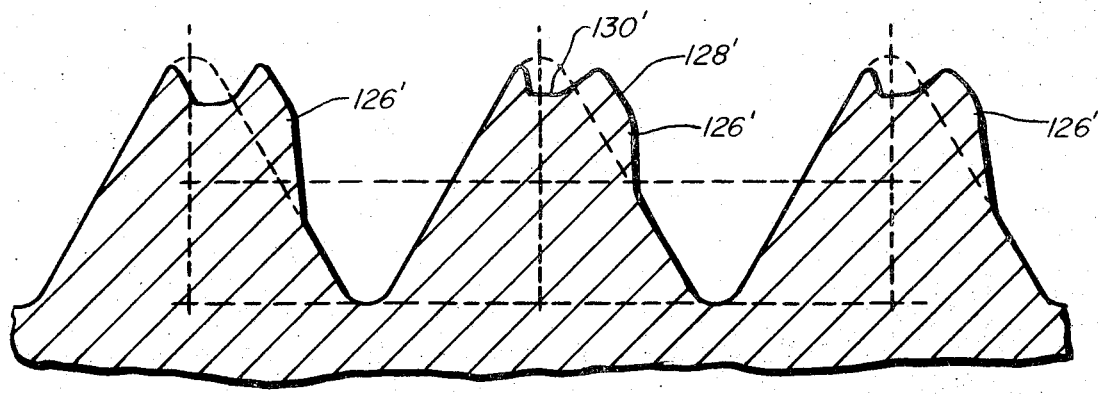
Fig_18
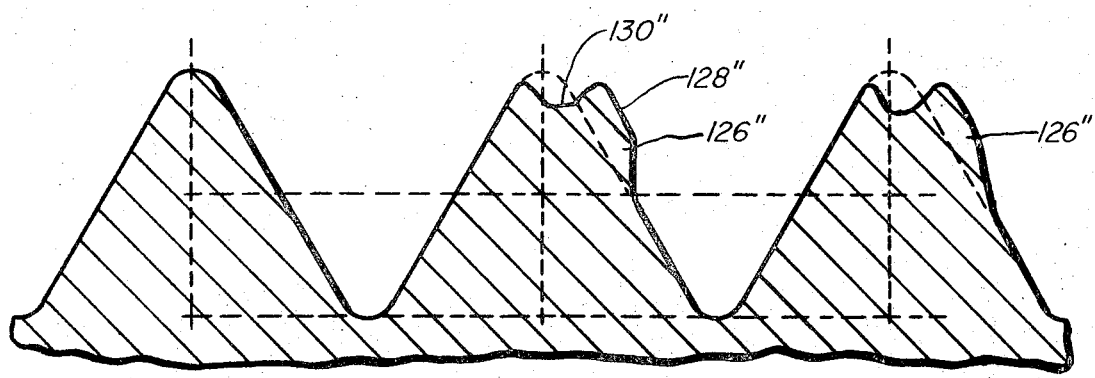
Fig_19
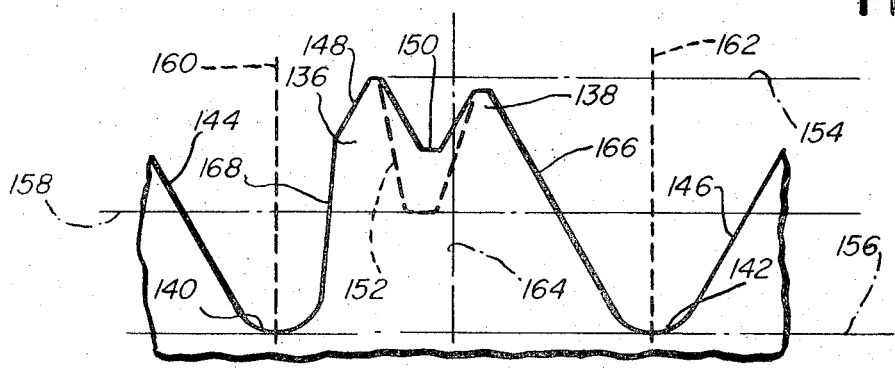
Fig_20

SELF-LOCKING FASTENERS

This case is a continuation-in-part of my copending Pat. application Ser. No. 200,933, filed Nov. 22, 1971, and entitled "Self-Locking Screws and Dies for Making Screws".

BACKGROUND OF THE INVENTION

This invention relates to self-locking threaded fasteners.

Self-locking screws are widely used with correspondingly threaded nuts and tapped holes. The Locking Fastener Section of the Industrial Fastener's Institute has established specifications for the locking characteristics of such screws. The standards generally contemplate that a self-locking screw of a given size, when screwed into a nut of corresponding size, would require no more than a predetermined torque to make the initial installation. There is also a requirement for a minimum break-away torque for the same screw after it has been removed, reinserted and removed a fixed number of times, and it is desirable that the ratio of the initial drive torque to the final removal torque be relatively low. Stated in simpler terms, this means that the locking action is still effective after a number of uses of the threaded fasteners. It should be understood that while the prior art primarily discloses self-locking screws, the invention disclosed herein pertains to both internal and external locking threads.

Many commercially available self-locking threaded fasteners embody in or between the threads some kind of yieldable, nonmetallic material that has been secured to the threaded structure by a secondary operation. These fasteners have characteristically been so high in cost that they are only employed for special applications. Other types of locking fasteners utilize deformed or mismatched threads which create increased friction between the mating threads. These locking fasteners have been relatively expensive and many of them lose their locking properties after a few uses.

A self-locking fastener using a resilient rib on the flank of the thread is described in my U.S. Pat. No. 3,517,717 issued June 30, 1970. My application Ser. No. 26,520 filed Apr. 3, 1970, now U.S. Pat. No. 3,653,241, teaches the dies and the method for making the locking thread described in U.S. Pat. No. 3,517,717, and my application Ser. No. 26,529 filed Apr. 3, 1970, now abandoned, discloses still another form of self-locking thread. The self-locking threads described in the patent and applications are inexpensive and have good torque characteristics; they have therefore received wide acceptance in the fastener market. However, in some instances, die life has not been as long as might be desired. In addition, for certain applications, such as aluminum castings, scoring of the matching threads and other minor problems were encountered.

SUMMARY OF THE INVENTION

The present invention is an improvement over the locking fasteners discussed above in which the locking rib has an overall generally triangular, cross-sectional configuration, but is provided with a bearing surface which is generally parallel to or aligned with the surface of the mating thread. This bearing surface provides a fourth "side" to the rib when viewed in cross-section, and it may therefore be termed a quadrilateral rib, despite its overall generally triangular form. The rib has a bottom wall commencing at the flank near the pitch line and normally between the pitch line and the root of the thread, and an inner wall commencing in an open groove between the crest of the rib and the crest of the remainder of the thread. The outer wall intersects the inner wall along an arcuate ridge or crest line which inner wall along an arcuate ridge or crest line which line is located longitudinally relative to the axis of the screw between the root of the one flank and the remaining crest of said one thread, with the outer face of said rib having a surface disposed generally parallel to the original flank or at an included angle of approximately sixty degrees with respect to the thread face on the distal side of the thread. In one form the crest of the rib is outside the pitch line of said thread but lower than the remaining crest of the thread, and the included angle between the faces of the rib adjacent the crest thereof form approximately a right angle before assembly to a mating thread. In other forms the rib crest may be about equal to or slightly higher than the remaining crest, and the included angle near the crest of the rib may be in the order of 55° or 60°. In some forms the inner wall at some place in its width intersects the transverse line that defines the mid-section of the thread, and the intersection of the inner wall and the remaining flank of the thread defines an open spiral groove or cavity having an included angle greater than 45°. The included angle of the open groove can be substantial, in one instance being 77°, and in another being in the order of 90°.

Another aspect of the invention involves the use of a locking rib having a generally quadrilateral form before assembly with a meshing thread. The rib is disposed with its base line on the flank of the thread, inner and bottom walls extending outward from the base line of the rib, and an outer wall joining the inner and bottom walls. The outer wall may form an included angle of approximately 60° with respect to the oppositely disposed flank of the thread. Preferably an obtuse angle is formed between the bottom wall and the outer wall. The crest or peak of the rib defined by the intersection of the inner wall and the outer wall is normally outside the pitch line of the thread, and may be approximately equal in height or slightly higher than the crest or peak of the remaining thread. Normally, a plurality of ribs will be disposed on successive threads.

The invention further contemplates a thread rolling die for rolling the self-locking threads of the invention on a cylindrical surface such as a screw blank. The die has at least one face having a plurality of generally parallel ridges adapted to form corresponding threads on a cylindrical work-piece and having at least one interval thereof in which a portion of the flank of at least one of the ridges is cut and formed significantly along a path parallel to the crest away from its normal flank configuration to form a rib extending outwardly beyond said flank, the rib having a surface disposed at an angle of approximately 60° with the opposite flank of the ridge, and a cavity being located in the flank coextensive with said rib. The rib is disposed adjacent to the cavity in the flank which is substantially equal in volume to the rib, and the rib parallels throughout a major portion of its length, the crest of a die ridge and extends upwardly from the root between die ridges. Of course, the die is generally complementary in form with the resultant screw thread form.

One object of the present invention is to reduce the initial drive torque to removal torque ratio between an element having the locking thread and a conventionally threaded element.

It is another object to provide a locking thread which does not damage the mating threads particularly where those threads are manufactured of relatively low yield strength material.

It is still another object of the invention to provide a locking thread which is inexpensive to manufacture and which may be produced rapidly by means of thread rolling apparatus.

It is an object of the invention to provide dies capable of long-lived operation which will produce locking external threads of the invention and which will function for a large number of rolling operations.

BRIEF DESCRIPTION OF THE DRAWINGS

FIG. 1 is a side elevation of a screw having the locking thread in accordance with the present invention in an intermittent rib form;

FIG. 2 is a side elevation of a screw having the external locking thread of the present invention in a continuous rib form;

FIG. 4 is an axial sectional view to a greatly enlarged scale of the locking thread engaging a conventionally threaded cooperatively dimensioned internal thread;

FIG. 7 is a view of the upper movable die from the bottom when the die is normally positioned for use and showing the location on the surface thereof;

FIG. 8 is a top plan view of a conventional fixed die suitable for use with the movable die shown in FIG. 7;

FIG. 9 is a partially broken-away isometric view to a greatly enlarged scale of the upper surface of the movable die shown in FIG. 7 and illustrating the position of the rib on the die;

FIG. 15 shows the thread form of FIG. 11 following engagement with a mating standard thread;

FIG. 16 shows a screw provided with a rolling thread in accordance with the invention following engagement with a mating internal thread;

FIGS. 17, 18 and 19 are thread forms drawn from the face of an optical comparator viewing the rib form actually rolled on representative screw blanks with flat dies such as that shown in FIG. 12; and FIG. 20 shows an alternate rolling rib form.

Referring to FIGS. 1 and 2 there are shown screws 2 and 4 having a number of turns of conventional threads 6. Selected threads 8 on each have been modified from the conventional form to include quadrilateral ribs 14 which may have a discontinuous or intermittent form as on screw 2, or the continuous form as shown on screw 4. Other forms of the invention include intermittent ribs on two flanks, intermittent ribs staggered from one flank to the other and continuous ribs on two flanks. The rib may be positioned on either or both the pressure or nonpressure flanks although it is most preferable to provide either a discontinuous or continuous quadrilateral rib on the nonpressure flank of selected threads.

Accordingly to one embodiment of the present invention, certain of the threads are modified in shape in the manner generally indicated in FIG. 3. FIG. 4 shows the meshing relationship of the locking thread with a conventional internal thread. The rib 14 of FIG. 3 is generally quadrilateral in shape although it should be understood that as used herein the sides may be somewhat curved without departing from the invention. Where a curved face is used a straight line approximating the mean position of the curved line shall be indicative of the angular limitations recited herein. The locking rib 14 as shown in FIG. 3 is polygonal in shape, and has an overall triangular form as defined by the dashed line 18 along the base of the rib, referred to as the base line 18, and the inner face or wall 26 and the bottom face or wall 28. However, the surface of outer wall 24 of the rib 14 is modified to match the mating or cooperating threads so that a bearing surface is presented which is generally parallel to the mating thread. This fourth face 24 provides the quadrilateral shape referenced hereinabove. This smooth and relatively broad surface 24 has the advantage of avoiding scoring or cutting of the cooperating threads as they are torqued into engagement. The base line 18 extends from close to the root of the thread up to the remaining flank 20 of an individual thread 8 having an opposite flank 22. The outer face or wall 24 of the quadrilateral rib 14 is most preferably disposed at a 60° included angle with respect to flank 22. The vertical centerline 29 of the thread, sometimes called the transverse mid-section line will, therefore, normally form an angle of about 30° with respect to flank 22 and outer face 24 of quadrilateral rib 14. Some variation is possible but this 60° inclination is preferable because conventional threads have that angle between their flanks and standard physical gaging means utilize the 60° angle as a reference to check other thread dimensions.

A face 24 which is generally parallel to the original flank and to the mating threaded element is desirable to avoid stress concentration in the mating thread although arcuate and other curvilinear forms are satisfactory as long as the variations from the parallel form are not so great as to cause stress concentrations. There may be slight curvature of the outer face 24 of the rib such that the center portion thereof bows away from the flank upon which it is disposed. The inner face 26 of the rib 14 interesects face 24 substantially at right angles.

Figure 3:
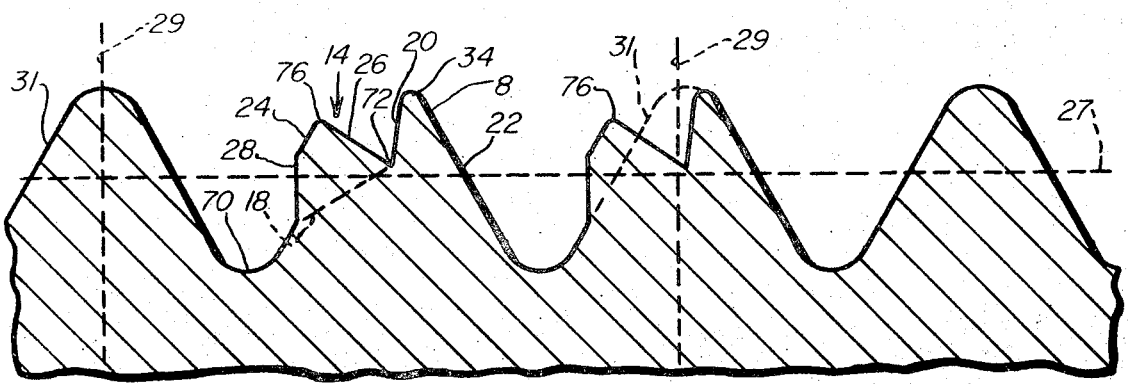
FIG. 3 is a longitudinal section to a greatly enlarged scale of a threaded surface showing an illustrative locking rib of the present invention disposed on two threads thereof.

The inner face 26 intersects the adjoining flank 20 of the thread 8 above the pitch line 27 and near the intersection with the transverse mid-section line 29. Note that the transverse mid-section line 29 extends into the spiral groove between the rib crest and the crest of the remainder of the thread. The angle between the inner face 26 and the adjacent flank 20 is in the order of 77° in FIG. 3 and will generally be more than 50° and will sometimes be an obtuse angle in various embodiments of the invention. This angle plays a part in determining the amount of resilient deflection of the rib which may occur. Inner face 26 and flank 20 may be somewhat curvilinear although the magnitude of the angle between the faces is still important to provide the ncessary resiliency. Also, with the relatively large angle, die life is improved, because the die rib is stronger and less subject to chipping or breakage. The intersection of inner face 26 and outer face 24 is ordinarily outside the pitch line 27 of the thread 8, and in certain embodiments may equal or exceed the height of the remaining crest. In the cross-sectional view of FIG. 3, the bottom face 28 of the quadrilateral rib 14 is shown as a straight line although the contour may vary widely without departing from the invention. Most importantly, the included angle between outer face 27 and bottom face 28 is obtuse so that upon deflection of rib 14 no sharply pointed area which would produce stress concentration is presented to the mating flank 30. In some forms of the invention, the included angle may even closely approach 180°. The position of a conventional thread 31 in FIG. 3 is shown in dashed lines superimposed on a locking thread 8 to show the relationship therebetween.

As is apparent from FIGS. 1 and 4, the assembly of threads 8 provided with ribs 14 with mating conventional threads produces deformation of rib 14 as it bears against the flank 30 of the mating conventional thread. The compression and elastic deformation of that rib produces good locking action which prevents undesired loosening of the mating threads. It should be noted that the self-locking feature of the screw as herein disclosed, is effective with mating threads having varying degrees of tolerances. These desirable characteristics result in part from the massive rib and the open groove, providing both compression and beam type elastic bending. It is effective with loose as well as snug fits although it is essential that there be interference between the rib 14 and the mating thread whereby resilient deformation of the rib occurs. Rib 14 extends a sufficient distance from flank 20 so that industry torque requirements are satisfied.

It should be understood that while the locking thread may be most inexpensively and rapidly produced by thread rolling on an external cylindrical surface, the thread may be manufactured by other means on internal surfaces as well as on external surfaces. Most preferably, the mating thread 31 of the nonlocking type is manufactured of a material at least as hard as the material from which the locking thread 8 is manufactured. Use of a softer material may result in deformation of the nonlocking thread 31 rather than deflection of the rib 14 on the locking thread 8. However, this is minimized by the use of the bearing surface 24. Ordinarily the deformation of the rib in the assembled state will not be permanent. However where the matching threads are at the tight end of the tolerance, the elastic limit of the rib 14 may be exceeded in certain areas so that the rib form will be subject both to a permanent set primarily as a result of compression, and also to resilient deflection. Such action appears to be present in the showing of FIG. 4. The root 70 of the locking threads 8 and conventional thread 6 is normally identical.

It is to be noted that although some permanent deformation may occur after the initial connection of a locking thread with a conventional mating thread, that deformation is not so great that the screw will lose its effectiveness as a locking threaded connector. Stated in other terms, the resilient nature of the ribs allows repeated insertions and removals from the mating thread while retaining the locking characteristics. The use of the continuous form of ribs 14 as shown in FIG. 2 results in the maximum locking forces for a given number of locking threads. As will be described hereinafter, the use of intermittent or discontinuous ribs 14 increases the die life where the threads are manufactured by thread rolling techniques. Ordinarily, it will only be necessary to position a rib on approximately six flanks corresponding to the threads in an axial distance equal to six times the pitch. Depending upon the torque requirements, however, a smaller or larger number of ribs may be utilized. It is, of course, not necessary that successive flanks be deformed.

The preferred method of manufacturing the self-locking thread on external surfaces is by means of thread rolling because of the great speed and accuracy which are possible with minimum unit cost. For internal threads and certain external threads it may be desirable to manufacture the self-locking thread of the invention by means of milling, electrical discharge machining or other means. Thermoplastics may be readily formed by heating a suitably sized blank and torquing the blank into engagement with a mating thread. Planetary dies may, also, be utilized to manufacture the locking thread of the invention although flat dies are somewhat more preferable because of their reduced cost. Such dies are shown in FIGS. 7 and 8 and are indicated generally by the numerals 52 and 54. The construction of these dies and the method of using them, apart from the modified thread form, are well understood in the art and details need not be shown herein. The general description of the dies, self-locking thread and method for making each described in commonly owned U.S. Pat. No. 3,517,717 is hereby incorporated by reference. It is sufficient to say that the shorter die 54 is held stationary in a thread rolling machine, the longer die 52 is moved back and forth parallel to die 54 by the thread rolling machine and a cylindrical workpiece is introduced between the properly spaced dies, and as it rolls thererebetween, the metal of the workpiece is progressively formed by the ridges or teeth of the dies 52, 54. When the movable die 52 has carried the rotating workpiece to the end of the short die 54, the threads of the screw will be fully formed and the complete screw will fall away.

Figure 5:
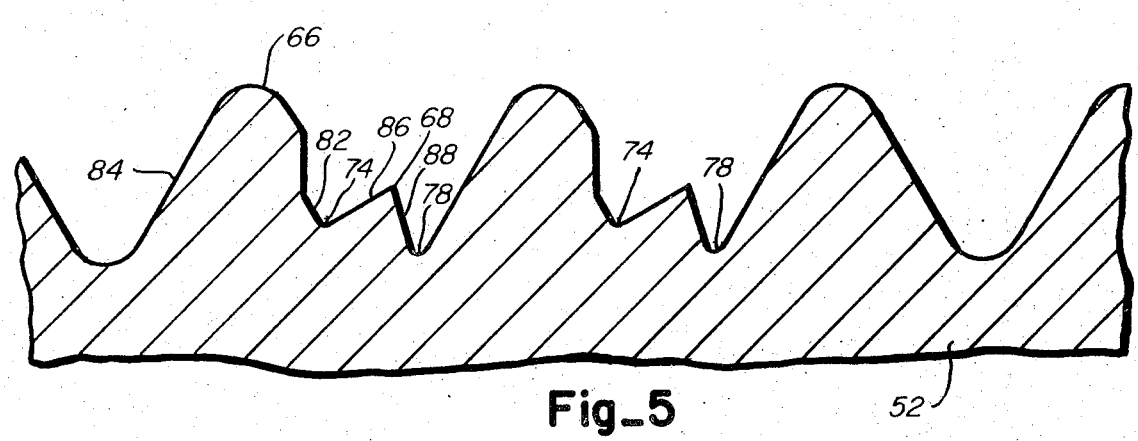
FIG. 5 is a transverse sectional broken-away view of a die in aligned relationship to the corresponding threaded surface in FIG. 3 and taken at line 5—5 of FIG. 7.

According to the present invention, it is proposed that certain of the threads of the die 52 at a suitable location, as for example at the area 56, be deformed in the manner generally indicated in FIG. 5. The transverse cross-sectional contours of the die 52 taken through the section 56 will be seen to be complementary to the contours of the locking thread shown in FIG. 3. The longitudinal positioning of area 56 on die 52 has been selected such that when the workpiece has reached a point between the dies where it is about to roll through area 56, the screw threads of conventional nature have been almost fully formed and hence are ready to take the deformation provided by the reformed walls of the threads of the die in area 56. In addition, the longitudinal position is selected so that the ribs 14 that are formed by die 52 will not be damaged by die 54. The short die 54 may have similarly reformed portions which assist in forming the rib 14. Where the short die 54 has not been reformed, it is desirable to cut away a portion 57 thereof to avoid damage to the modified thread 8. The transverse positioning of area 56 has been selected such that the threads of the workpiece will be those that are engaged when the locking thread is coupled to a mating conventional thread. Most preferably, they will not be the starting threads so that initial assembly with a nut or with other mating threads is facilitated. The number of threads on the die 52 which are reformed will vary as a function of the torque requirements of the screw as described hereinbefore.

Figure 6:
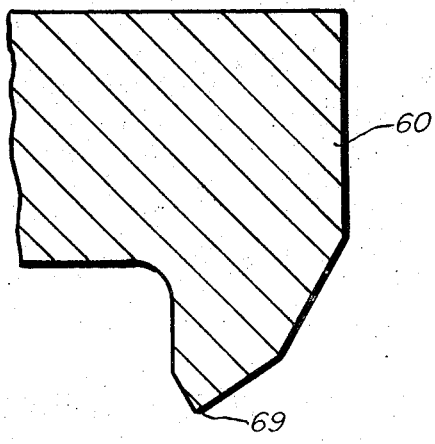
FIG. 6 is an end view of a tool for forming the die of FIG. 5 which has been modified with the tool so as to produce a die in accordance with the invention.

Turning now to FIGS. 5, 6, and 9 a portion 56 of the die 52 and the forming tool 60 for manufacturing the die are shown. FIG. 5 is a greatly enlarged cross-section of the reformed area 56 of the movable die 52 and FIG. 9 is an isometric view of the same area. The forming tool 60 appears in FIG. 6. When the thread creating ridges or threads 62, 66 were originally machined, the flanks thereof are undistorted in the manner of normal threads. Thereafter, in selected areas, and at selected distances along the flanks, the tool 60 of a length to produce the required length of rib is driven downwardly against the unhardened die flank forcing part of the metal outwardly to create the complement of the entire thread 8 including rib 14. This procedure creates a cavity complementary to the forming tool edge 69 as well as surface 88 which is relatively straight although not positively constrained by any corresponding surface. The complement includes a major peak or crest 66 and a minor peak or crest 68 corresponding respectively to root 70 and point 72 defined by the intersection of inner face 26 and flank 20, at the bottom of the open spiral groove. Roots 74 of the die 52 correspond to rib peaks 76. Roots 78 of the die 52 correspond to remaining peak 34 of the locking thread. Since this procedure is accomplished before hardening, no heating of the die 52 is necessary. If only one die is reformed, the length of the forming edge 69 corresponds approximately to the "unwrapped" length of the minor peak 76 of rib 14 in FIG. 3. If both dies are reformed, the reformed areas on each may be longitudinally positioned to phase the rib formed by one die to follow the rib formed by the other so that the sum of the length of the ribs on the two dies is at least as great as the unwrapped length of the external thread produced thereby. It will be apparent that the face 82 of the die corresponds to face 24 of the locking thread and is disposed at an angle of 60° with respect to flank 84. The minor peak 68 is positioned on a rib defined by faces 86, 88.

Movable die 52 and short die 54 are hardened after all of the ribs of the selected character and length have been formed. In operation, the dies 52, 54 will first create normal screw threads as the workpiece is initially passed therebetween and then form the locking threads of the invention with further relative movement.

Various modifications have been conceived to maximize die life. The modifications to increase die life include increasing the radius of the leading edge of the forming tool which is depressed into the die. This affects the external thread that is rolled with the dies, so that they will have a correspondingly larger radius formed at rib crest 76. The use of a larger radius decreases stress concentration particularly in the dies which are much more vulnerable to premature failure than the screw or other externally threaded objects which may be formed with the dies since the number of cycles ordinarily contemplated for a die exceed 100,000 as opposed to a relatively small number of cycles for a fastener.

Figure 10:
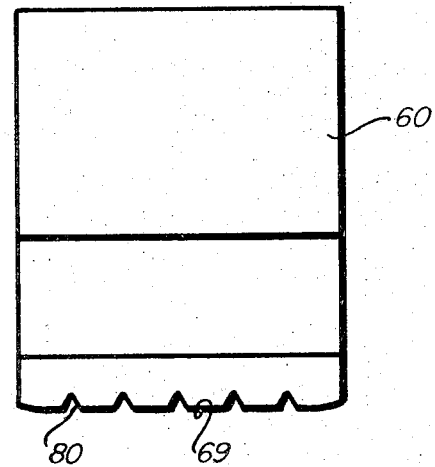
FIG. 10 is a side elevational view of the forming tool shown in FIG. 6.

The use of intermittent ribs 14 as shown in FIG. 1 also increased die life because the rib forming portion tends to increase stress levels. The intermittent ribs 14 are most rapidly manufactured from dies that have been modified with a forming tool having a plurality of indentations 80 in the forming edge 69 whereby a discontinuous series of depressions are made in the die 52 as shown in FIG. 10.

Still another means for increasing die life is to taper the extremities 83 of the forming edge 69 of the forming tool that is used to press into the die. More specifically as shown in FIG. 10 the relief of this surface in the forming tool produces an indentation having end extremities of gradually decreasing depth. This means that externally threaded surfaces which are produced with the dies have ribs that are faired into the flanks upon which they are carried, so that scoring of the mating internal thread is minimized; and the sharp corners on the die as shown in FIG. 9 are changed to smooth transitions to the standard die thread form.

Figure 11:
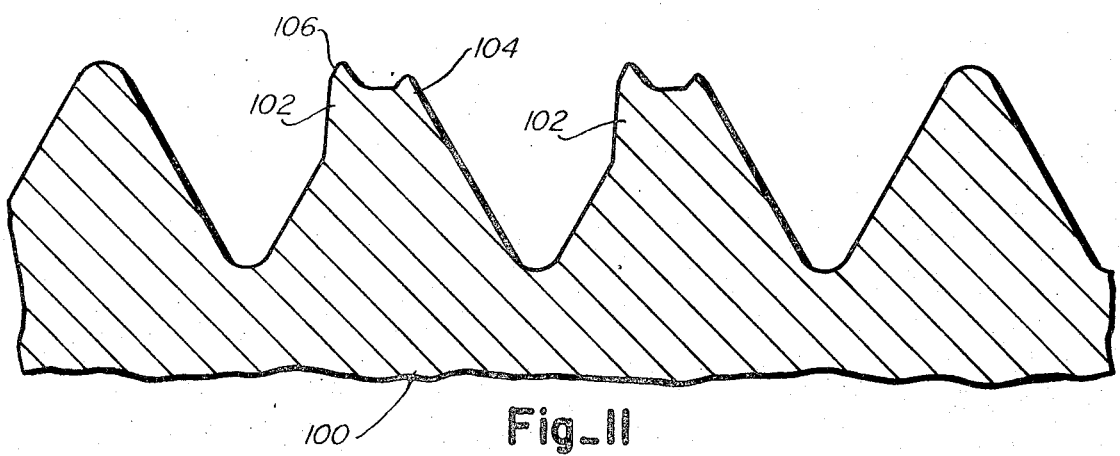
FIG. 11 shows an alternate thread form in accordance with the invention.

As mentioned in the introduction of the present specification, certain problems have been encountered when the prior locking thread configurations were used in tapped holes in castings. More particularly, it appears that holes in castings are frequently oversize so that the tapped holes are not fully formed in their inward extent. Accordingly, for such applications, rib forms where the rib is located near the root of the thread form of a screw are not as effective as locking rib configurations where the rib extends to substantially the same height as the normal or the remaining crest of the thread. The thread form of FIG. 11 is particularly designed to accommodate this situation and has the rib 102 extending even somewhat higher than the remaining crest 104. It may also be observed that the rib is provided with the bearing surface 106 discussed above and therefore provides the advantages discussed above relative to surface 24 of FIG. 3.

Figure 12:
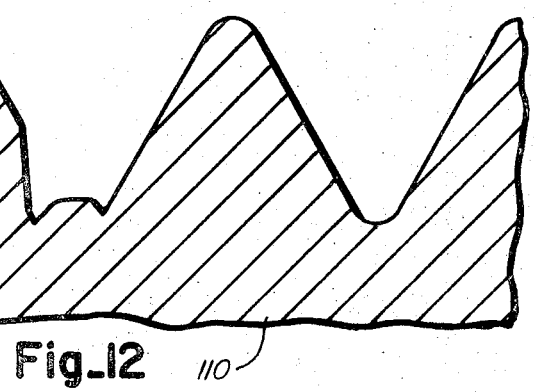
FIG. 12 shows a cross sectional view of flat die employed to roll the locking thread of FIG. 11.

The thread structure 100 of FIG. 11 may be made by flat thread rolling dies of the type shown in FIGS. 7 and 8 of the drawings, and FIG. 12 is a cross-sectional view of a die 110 having a complementary configuration relative to the thread form 100 of FIG. 11.

Figure 13:
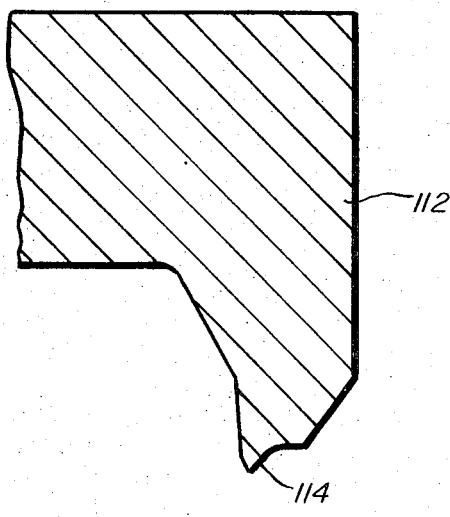
FIGS. 13 and 14 are a cross sectional view and side view of a tool employed to modify the flat die to the form shown in FIG. 12.
Figure 14:
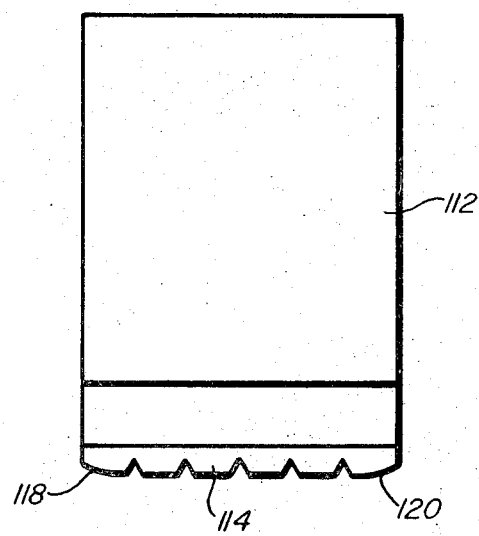

The die form 110 may be initially formed in the conventional manner with conventional nonlocking threads on its working surface. However, prior to heat treatment, it may be modified through the use of the tool 112 shown in cross section in FIG. 13 and in a side view in FIG. 14. The tool 112 has a forming surface 114 which produces the modified groove configuration 116 on the die 110, which in turn produces the rib form 102 which appears in FIG. 11. The cutting blade 114 on the tool 112 has ends 118 and 120 which are curved back from the edge on the main portion of blade 114. This provides tapered recess 116 on the thread rolling die, which in turn produces a rib form 102 which is faired into the surface of the thread at each extremity. Typically, the width of the tool blade 114 is approximately equal to the "unrolled length" of a single turn of threads on the screw shown in cross section in FIG. 11.

Of course, as discussed below, the die form 110 can be made by other techniques.

FIG. 15 shows the thread form 100 following engagement with a complementary internal thread form on a casting or nut 122. The internal threads on the body 122 are shown as terminating in surfaces 124, so that the internal threads are not fully formed. This is a problem which, as mentioned above, is frequently encountered where holes in casting are drilled oversize and subsequently tapped.

Note that, as shown in FIG. 15, the ribs 102 are engaged by the internal threads on body 122 and are fully active in performing their locking function despite the oversized hole terminating in surfaces 124 and the lack of fully formed threads.

FIG. 16 shows the screw 100 of FIGS. 11 and 15 assembled with the nut or other body 122 having incomplete internal threads. The fairing of the ribs into the flank of the threads is clearly shown in FIG. 16.

FIGS. 17, 18 and 19 are drawings made from the face of an optical comparator employed in viewing actual screw threads formed using the quadrilateral rib form located mainly above the pitch line of the screw to provide good locking action even with incompletely formed internal threads. Superimposed on the thread forms of FIGS. 17, 18 and 19 are dashed lines showing the undeformed thread shape, the center lines of the undeformed thread and the root and pitch lines of the thread. The locking rib is designated 126, 126' and 126'' in FIGS. 17, 18 and 19, respectively. Particularly to be noted is the broad surface area of the actual bearing surface 128, 128' and 128'' of the ribs in the three showings. Another important feature is the broad and open nature of the spiral groove 130, 130' and 130'' in these three figures. It may also be noted that the crest of the rib and the crest of the remaining undeformed thread are of the same general height, with the rib being slightly higher than the remaining crest in some cases and in other cases with the crest of the remaining thread being slightly higher than the rib peak.

FIG. 20 shows another rib form in which an external thread is provided with a rib 136 and a "remaining crest 138." The adjacent roots 140 and 142 and the continuing lines 144 and 146 are provided on either side of the rib thread structure 136, 138, by way of reference. The rib form of FIG. 20 is of particular interest because it was formed using a die in which the rib form was ground into the die structure rather than being produced by a tool such as tool 60 of FIGS. 6 and 10 or tool 112 of FIGS. 13 and 14. In accordance with normal die practices, the dies such as those shown in FIGS. 7 and 8 of the present drawings are manufactured by a grinding operation in which the grooves are ground into the surface of the die by a formed grinding wheel. The desired shape of the surface of the grinding wheel is obtained through the use of a crush roller. Thus, the sequence of steps in prepared a die of the type shown in FIGS. 7 and 8 would involve first, preparing a crush roller having the desired surface configuration, secondly, modifying the surface configuration of the grinding wheel by engagement of the crush roller in accordance with known grinding practices, and then grinding the surface of the dies, such as shown in FIGS. 7 and 8 to the desired form for rolling the screw threads. Ultimately, of course, the screws are rolled on the dies as described above.

It is interesting to note the series of complementary changes of form which can be observed in this process. First, the ultimate cross sectional form of the screw appears on the die surface as the complement of the cross sectional configuration of the screw. Secondly, the grinding wheel has on its surface the complement of the desired form of the die and thus would have a cross sectional shape similar to the cross sectional view of the screw. Third, the crush roller which is employed to form the surface of the grinding wheel would have a surface configuration complementary to the desired form on the grinding wheel and thus a cross sectional configuration similar to that of the dies.

Thus, with reference to FIG. 20 when viewed right side up, the thread and rib form could represent the cross section of the screw and also of the grinding wheel; and when viewed upside down could represent the cross sectional configuration of the crush roller and the die.

The rib form shown in FIG. 20 of the drawings could be employed on all of the threads of the die, in which case the entire surface of the flat thread rolling dies could be formed with ridges in the complementary configuration; alternatively, following a few "normal" or standard threads on the screw, the remainder of the screw (and the flat die) could be provided with a ribbed configuration.

In the showing of FIG. 20, the spiral groove 150 extends approximately one-half the distance from the crest of the rib to the pitch line. For certain applications, such as for securing screws in tapped holes in aluminum castings, it would be desirable to provide a rib having greater resiliency and less resistance, to preclude binding in the soft aluminum. For this type of application, the spiral groove may take the cross-sectional form shown at 152 in dashed lines in FIG. 20.

The open groove may, in this instance, extend to approximately the depth of the pitch line of the screw. It should however be relatively open as shown to permit the use of a strong die configuration, in which the complementary shape would provide recesses corresponding to the rib 136 and the "remaining crest" 138 and an outwardly extending rib on the die corresponding to the spiral groove 152 which will be formed on the screw thread.

There are several advantages in the use of a crush roller and a grinding wheel having the desired rib configuration as compared with the use of a forming tool on a standard flat die. One of these advantages involves the possibility of making a die which has precisely the desired shape without undue concern about weaknesses in the die which can arise from deformation by the forming tools such as those shown in FIGS. 6, 10, 13 and 14. When the forming tools are employed, if excessive amounts of the flat die flank or root are displaced, the die may be weakened so that shortened die life may result. When the dies are initially ground to the desired form, however, this problem is avoided. The rib form of FIG. 20 may be provided with a broader bearing surface 148 than the surface 106 shown in FIG. 11, for example, without fear of unduly weakening the die.

In addition to the use of flat dies for rolling threads, circular dies are frequently employed for forming threads on larger diameter stock. These rolled dies can be ground to the proper shape and may be employed to produce locking ribs on larger stock material. Of course, it was not possible to utilize tools such as those shown in FIGS. 6, 10, 13 and 14 to provide suitable shape on the circular thread forming dies. Thus, the use of a crush roller and a grinding wheel to prepare the ribbed dies has broadened the type of screw thread to which the new rib form can be easily applied.

Returning to a more detailed consideration of the thread form shown in FIG. 20, the OD of the thread is shown by line 154 and the root diameter of the thread is shown by line 156. The pitch line is indicated by line 158. The center of the normal root of the thread structure is shown by dashed lines 160 and 162 and the center line of the normal thread would be at line 164. The right-hand flank 166 of the thread is unchanged from the normal position, and has the normal inclination of 30° relative to line 164 for example, representing the center of the thread. Similarly, the other face of the remaining crest 138 and both of the outer most faces of rib 136 (neglecting the small flat) make angles of 30° relative to line 164. The bottom wall 168 is substantially steeper and approaches to 5° of the root or a line extending perpendicular to the axis of the screw.

In view of the fact that the right-hand flank 166 of the screw thread is identical to a standard thread form, the crest 138 is referred to as a "remaining crest," or the crest of the "remainder of the undeformed original thread," although it may be formed by either of the techniques described above.

For completeness, it may be noted that various heat treating processes are utilized to maximize die life for particular applications. The method of manufacturing the self-locking threads with the dies will be more apparent by referring to U.S. application Ser. No. 26,520 filed Apr. 3, 1970, noted above, having the same inventor and assignee.

For different sizes of threaded surfaces, it is necessary to vary the angles and position of the rib as will be apparent to those skilled in the art.

In considering the present invention relative to prior self-locking threaded fasteners, reference is again made to applicant's U.S. Pat. No. 3,517,717 showing a very thin rib; and to applicant's prior development of fasteners with a massive or thick rib, as shown in U.S. Pat. application Ser. No. 26,529 cited above and in an article entitled New Thread Form which appeared at pages 57 and 58 of the Jan. 4, 1971, issue of Product Engineering. Reference is also made to E. M. Ilsemann U.S. Pat. No. 2,301,181 granted Nov. 10, 1942. As noted above, certain problems posed in the self-locking threaded fastener field involve (1) the provision of an inexpensive threaded fastener which will have (2) a relatively low ratio of initial torque to final removal torque after several operations, while (3) accommodating the various mating threaded fasteners of different sizes as permitted by production tolerance standards for mass produced nuts and screws. It is also desirable to have a locking thread configuration which will (4) permit use of relatively hard self-locking threads with softer mating threads, so that seel locking threads could be properly used and reused in aluminum or zinc die castings, for example, without objectionable galling, extruding, or otherwise altering the mating threads of the tapped hole.

The E. M. Ilsemann U.S. Pat. No. 2,301,181 is of interest in showing a thread which is provided with protrusions and recesses on the flank of the thread for locking purposes. However, only compressive forces come into play in the Iselmann screw, and accordingly the bending or deflection action forming an important part of the present invention to provide the high resiliency and resultant low torque ratio is not present.

As compared to the prior rib structures as shown in the U.S. Pat. No. 3,517,717, U.S. Pat. application Ser. No. 26,529, and the Product Engineering article, the provision of a bearing surface represents a further advance which is particularly useful in applications involving softer metals and in connection with the accommodation of substantial variations in the size of mating threaded fasteners. It is particularly to be noted that the present invention contemplates the provision of bearing surfaces which extend generally parallel to the original flank of the screw thread so that it makes initial surface-to-surface area contact with the mating threaded fastener. The use of the bearing surface area distinguishes from the initial line contact of the prior locking ribs, and produces compressive deformation of the rib without galling or removal of metal even when relatively softer internal threads are engaged by a harder threaded screw having the self-locking rib. This permits either substantial compressive deformation of the rib combined with resilient deflection of the rib in the case of tightly fitting threads, or in the case of loosely fitting threads, a lesser degree of permanent deformation resulting from compression but still accompanied or followed by the necessary resilient deflection or bending to achieve the desired low ratio of initial to final torque after several "on-off" cycles.

The use of an open spiral groove in combination with the bearing surface contributes significantly to the improved combined compression and resilient deformation action noted above, and also permits significantly increased die life in view of the stronger die ridges which may be used in producing these grooves.

The use of a bearing surface on the rib which is above the pitch line of the threads, and a rib crest comparable in height to that of the remaining crest is also advantageous, particularly when incompletely formed threads are encountered.

Regarding particular dimensions, the illustrative examples included in the drawings show that the included angle at the peak of the massive rib should be in the order of about 55° to 100° and preferably in the order of 60° to 90°. Also, the inner wall of the rib should make a substantial angle at the bottom of the spiral groove, or the groove may have two sidewalls and a bottom so that the groove is open in nature, and not closed as in many of the embodiments shown in my granted patent. In addition, the crest of the rib should be spaced out well from the flank of the thread, preferably in the order of half-way from the normal crest of the thread to the adjacent root. These dimensions are helpful in achieving the smooth compression and resilient deflection which is important to proper and consistent locking fastener action.

Those skilled in the art will recognize that the invention provides a locking screw requiring a low initial drive torque while avoiding damage to the mating threads and which is inexpensive to manufacture. Similarly, experience with the dies will show they are capable of long-lived operation while accurately producing threads in accordance with the invention.

I claim:

1. A self-locking threaded fastener for use with mating fasteners manufactured to a standard thread configuration;

said locking fastener being provided with mechanical means for smoothly compressing to accommodate tightly fitting soft mating threads without galling or scoring, and for consistently deflecting upon engagement with a standard mating thread to provide consistent and repeatable locking action;

said mechanical means constituting an integral protrusion extending from one flank of at least one turn of the thread of said locking fastener substantially beyond the normal flank of said thread, and extending away from the flank over at least a substantial portion of one turn of said thread to form a groove between the rib and the remainder of the thread, said protrusion being in the form of a resiliently yieldable rib having a crest, the rib having an external generally rectilinear cross-sectioned surface located in its entirety substantially beyond the normal flank of said thread adjacent the crest which rib, prior to assembly with a mating thread, constitutes a generally rectilinear cross-sectioned bearing surface which will make surface contact with the flank of the mating thread by virtue of its orientation to form an angle of inclination with the axis of the fastener which is substantially equal to the angle of inclination of the contacting surface of the mating thread, said rib having a second external surface interconnecting said bearing surface with the remaining crest portion of said thread via said groove, and a third external surface interconnecting said bearing surface with the root of said thread.

2. A self-locking threaded fastener as defined in claim 1 wherein said rib is faired into the flank of the thread.

3. A self-locking threaded fastener as defined in claim 1 wherein said rib has an included angle at its crest of between 55° and 100°.

4. A self-locking threaded fastener as defined in claim 1 wherein said rib is substantially equal in height to the crest of the remainder of the original thread.

5. A self-locking threaded fastener as defined in claim 1 wherein the cross-section of said rib is substantially quadrilateral in form.

6. A self-locking threaded fastener as defined in claim 1 wherein said groove is open and is substantially flat near the center and is relatively steep near the crest of the remainder of said thread and near the crest of said rib.

7. A self-locking threaded fastener as defined in claim 1 wherein the volume of the rib extending beyond the flank of the original undeformed thread is substantially equal to the volume of metal displaced from the original thread in the vicinity of said groove.

8. A self-locking threaded fastener as defined in claim 1 wherein the crest of said rib extends radially further from the root of the thread than the crest of the remainder of said thread.

9. A self-locking threaded fastener having at least one massive rib protruding outwardly from one flank of a thread substantially beyond the normal flank of a standard thread, the other flank of said thread extending to a crest formed by the remainder of the unmodified original thread, said rib and said crest forming an open spiral groove concentric with said rib and crest, said rib being provided on at least a portion of at least one turn of the thread, said rib having an outer surface area adjacent its crest forming a bearing surface located entirely beyond the normal flank of a standard thread and oriented at an included angle of substantially sixty degrees with respect to the other flank of said thread having said one massive rib and in substantial alignment with a surface area of the thread of a standard mating threaded element and having a generally rectilinear cross-section, said rib having a second external surface interconnecting said bearing surface with the remaining crest portion of said thread via said groove, and a third external surface interconnecting said bearing surface with the root of said thread; and said rib causing the fastener to be locked upon assembly with a mating standard threaded element when said external surface area of the rib comes in surface contact with the mating threaded element; with said rib adjacent said external surface area of said rib, upon engagement with the mating threaded element, being compressed in a direction normal to said bearing surface area, and resiliently deflected in the direction of the axis of the threaded fastener.

10. A body adapted for engagement with a mating thread, having self-locking threads disposed thereon wherein at least one of said threads has a quadrilateral rib on at least one flank extending substantially beyond the normal flank of said thread, said rib having a spiral groove between it and the crest of the remainder of the thread, said rib having a bottom wall commencing at the said one flank intermediate the pitch line and the root of said thread and extending externally of the normal flank of said thread, an inner wall extending along one side of said groove, an outer wall extending from said bottom wall to intersect said inner wall along an arcuate rib crest line which line is generally midway in an axial direction between the root of said one flank and the remaining crest of said thread, said outer wall of said rib having a generally rectilinear cross-sectioned surface disposed parallel to the mating thread flank at an included angle of approximately sixty degrees with respect to the other flank of said thread, said last mentioned surface being located in its entirety substantially beyond the normal flank of said thread.

11. A body as set forth in claim 10 wherein said groove at some place in its width intersects the transverse plane that defines the midsection of the cross-section of said thread.

12. A locking thread as described in claim 10 wherein a plurality of said ribs are spaced along a helical thread of the conventional type.

13. A self-locking thread in which at least a part of one pitch of the thread has, intermediate the crest and root in at least one flank of said thread, an arcuate rib defined by an arcuate outer wall and an arcuate inner wall which walls intersect to form an arcuate outer edge exterior of the normal flank of said thread, said outer wall having a bottom surface intersecting said flank along an arcuate line at the bottom edge of said surface, said inner wall having an inner arcuate edge within said flank, said inner wall and said flank defining a space therebetween which extends radially inward of said outer edge, said bottom edge of said bottom surface and said inner edge of said inner wall all being concentric with said thread crest, the orientation of said outer and inner walls being such that the said outer edge and the adjacent outer part of said rib can bend toward said flank when engaged by the flank of a thread of a correspondingly sized conventional thread with the outer wall of said rib in tension and the inner wall in compression, said rib being yieldable in the direction of said flank with the said inner wall being placed in compression and the outer wall in tension when said self-locking thread is mated with a correctly sized cooperating conventional thread, characterized in that in the unflexed and unstressed state said rib has as a first portion of said outer wall, a relatively broad smooth bearing surface area disposed for parallel extended surface engagement with a cooperating conventional thread, said relatively broad smooth bearing surface area being located in its entirety substantially beyond the normal flank of said thread and also having a generally rectilinear cross-section and being broad in a direction between the crest and root of said thread, and as a second portion of said outer wall an additional surface external of the normal flank of said thread interconnecting said bearing surface with the remainder of said thread adjacent the root of said thread.

14. A self-locking threaded fastener as defined in claim 1, wherein said external generally rectilineary cross-sectioned surface makes an included angle of sixty degrees with the flank of the opposite side of said thread.

15. A self-locking threaded fastener comprising:
a plurality of standard lead-in threads at one end of said threaded fastener for engaging matching threads of a standard mating threaded fastener;
means including at least one resilient bendable rib for providing locking action between said locking threaded fastener and the standard mating threaded fastener, with the outer portion of said rib in tension and the inner portion of said rib in compression;
said locking rib being located on the flank of said threaded fastener and being faired into said lead-in threads;
said rib extending beyond the normal flank position of said self-locking threaded fastener; and
said rib further having, in the unflexed and unstressed state, a generally quadrilateral cross-sectional shape and including three external surfaces comprising a pair of surfaces extending outwardly beyond the normal flank portions of the standard thread configuration with an intermediate surface joining said pair of surfaces, the intermediate external surface of said rib being substantially rectilinear in cross section and providing a substantial area extending generally parallal to corresponding flank portions of said standard thread configuration and to the matching surface of the flank of the thread of the standard mating threaded fastener.

16. A self-locking fastener as defined in claim 15, wherein the rib extends away from the root of the threads of the locking fastener farther than the crest of the remainder of the thread from which the rib extends.

17. A self-locking fastener as defined in claim 15, wherein the combined cross-sectional area of the rib and the remainder of the thread from which the rib extends, is substantially equal to the cross-sectional area of a standard thread of said self-locking fastener; and wherein the flank of the remainder of the thread on the opposite side from said rib is substantially rectilinear in cross-section, and conforms to the standard thread pattern of said fastener.

* * * * *